United States Patent
Jin et al.

(10) Patent No.: US 9,279,040 B2
(45) Date of Patent: Mar. 8, 2016

(54) NON-ISOCYANATE RIGID POLYMER FOAMS BY CARBON-MICHAEL ADDITION AND FOAMING PROCESS

(71) Applicants: Xin Jin, Lake Jackson, TX (US); Steven P. Crain, Midland, MI (US); Deborah A. Schutter, Minooka, IL (US); Kshitish A. Patankar, Midland, MI (US); Mark F. Sonnenschein, Midland, MI (US)

(72) Inventors: Xin Jin, Lake Jackson, TX (US); Steven P. Crain, Midland, MI (US); Deborah A. Schutter, Minooka, IL (US); Kshitish A. Patankar, Midland, MI (US); Mark F. Sonnenschein, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/358,825

(22) PCT Filed: Dec. 20, 2012

(86) PCT No.: PCT/US2012/071069
§ 371 (c)(1),
(2) Date: May 16, 2014

(87) PCT Pub. No.: WO2013/101682
PCT Pub. Date: Jul. 4, 2013

(65) Prior Publication Data
US 2014/0343182 A1    Nov. 20, 2014

Related U.S. Application Data

(60) Provisional application No. 61/580,288, filed on Dec. 26, 2011.

(51) Int. Cl.
*C08J 9/14* (2006.01)
*C08G 61/12* (2006.01)
*C08F 222/10* (2006.01)

(52) U.S. Cl.
CPC .............. *C08J 9/146* (2013.01); *C08G 61/12* (2013.01); *C08J 9/14* (2013.01); *C08F 2222/1026* (2013.01); *C08G 2261/135* (2013.01); *C08G 2261/334* (2013.01); *C08G 2261/42* (2013.01); *C08G 2261/76* (2013.01); *C08J 2201/022* (2013.01); *C08J 2201/026* (2013.01); *C08J 2205/10* (2013.01); *C08J 2333/14* (2013.01); *C08J 2367/00* (2013.01)

(58) Field of Classification Search
None
See application file for complete search history.

(56) References Cited

U.S. PATENT DOCUMENTS

| | | | |
|---|---|---|---|
| 7,919,540 | B2 | 4/2011 | Heuts |
| 2005/0081994 | A1 | 4/2005 | Beckley |
| 2006/0069234 | A1 | 3/2006 | Kauffman |
| 2008/0132596 | A1* | 6/2008 | Heuts et al. ............... 521/186 |
| 2008/0281006 | A1 | 11/2008 | O'Leary |

FOREIGN PATENT DOCUMENTS

EP    1640388 A    3/2006

OTHER PUBLICATIONS

Cyclopentane Information. Sigma-Aldrich. http://www.sigmaaldrich.com/catalog/product/sial/459747?lang=en&region=US. As viewed on Jun. 29, 2015.*
Honeywell Enovate 245fa Technical Information. Honeywell International inc. Sep. 2012.*

* cited by examiner

*Primary Examiner* — Robert C Boyle
*Assistant Examiner* — Stephen Rieth
(74) *Attorney, Agent, or Firm* — Gary C Cohn PLLC

(57) ABSTRACT

Polymer foam is made from a two-component foam system. The foam system includes an A-side component which contains a multifunctional Michael acceptor and a blowing agent that has a boiling temperature in the range −40° C. to +100° C. The system also includes a B-side component that contains a multifunctional carbon-Michael donor, a surfactant and a blowing agent that has a boiling temperature in the range −40° C. to +100° C. The viscosities of each of the components are 2,500 cPs or lower. Foam is made by separately pressurizing the components, then separately depressurizing them so they each at least partially expand. The partially expanded materials are then combined in the presence of a carbon-Michael reaction catalyst to form a reaction mixture which is cured to form the polymer foam.

14 Claims, No Drawings ations, especially for producing low density sprayed polymer foams, and even more especially for producing foams that also have specific compressive strengths of at least 3.5 kN·m/kg and/or have mainly closed cells having a small cell size.

NON-ISOCYANATE RIGID POLYMER FOAMS BY CARBON-MICHAEL ADDITION AND FOAMING PROCESS

This invention relates to low density polymeric foams made in a carbon-Michael-addition reaction.

Polyurethane foams are very widely used. These foams are produced by mixing liquid or low-melting precursor materials, which simultaneously react and expand to form a polymeric foam. The precursor materials include an isocyanate-terminated compound and at least one isocyanate-reactive material. The isocyanate-reactive material typically includes alcohol, primary amino and/or secondary amino groups.

Among the advantages of polyurethane foams are their low cost, versatility and, in many cases, the ability to produce the foam at the time and in the place where the foam is needed. In particular, polyurethane foams are among the few types that can be used in spraying processes. Spraying processes are becoming increasingly popular material for producing polymer foams in the building and construction industry. Spraying methods are useful, for instance, to apply an insulating and/or sealing polymer foam into cavities and openings, cracks and gaps in building structures. These methods are especially useful when the amount of polymer foam that is needed in any particular spot is small, when the polymer foam is irregularly shaped, into hard-to-reach spaces, or when manufacturing processes do not allow a previously-made foam to be installed economically or easily. Spray foaming methods are also useful for rapidly applying polymer foam to large surfaces such as walls, floors, roofs and ceilings. Spraying methods are also used in continuous processes for producing products such as boardstocks and laminates. In these continuous processes, the foam spray often is applied to a substrate, which may be porous in some cases. The spraying process is especially useful when the substrate is porous, because there is a tendency for the materials to bleed through the substrate if applied in the foam of a liquid.

The spray foaming process involves dispensing a pressurized fluid foam formulation through a nozzle onto a substrate where foam is desired. The foam formulation then expands and cures into a rigid or semi-rigid foam after it has been applied. While the foam formulation expands it increases in volume within the space in which it is applied.

A problem with polyurethane spray foams is that they contain isocyanates. There can be concerns over the exposure of humans and animals to isocyanate compounds. Therefore, it is desirable to develop a polymeric spray foam system that contains little or no isocyanate-containing compounds.

U.S. Pat. No. 7,919,540 discloses rigid, low density foam whose formation relies on carbon-Michael chemistry instead of polyurethane chemistry. The invention of U.S. Pat. No. 7,919,540 is foam comprising the reaction product of one or more multifunctional acrylate compounds (Michael acceptors) with one or more multifunctional Michael donors selected from aceto- or cyano-acetate compounds or acetoacetamides in the presence of a base and a blowing agent. The foam manufacturing process described in U.S. Pat. No. 7,919,540 is a pour-in-place method, in which a liquid mixture containing a polyacrylate compound, a cyano- or aceto-acetate compound and a blowing agent is formed, then mixed with a catalyst and poured into a cavity to produce a polymeric foam. The liquid mixtures described in U.S. Pat. No. 7,919,540 are not easily adaptable to a spray process, and do not produce very low density (less than 40 kg/m³) polymer foams.

It would advance the art of spray foam by developing a polymeric spray foam system that does not require isocyanate-containing compounds but is still suitable for spray applications, especially for producing low density sprayed polymer foams, and even more especially for producing foams that also have specific compressive strengths of at least 3.5 kN·m/kg and/or have mainly closed cells having a small cell size.

In one aspect, this invention is a process for making a polymer foam, comprising the steps of:

forming an at least partially expanded reaction mixture by combining, at a temperature of at least 10° C., (1) a multifunctional Michael acceptor that has multiple Michael acceptor functionalities per molecule with (2) a multifunctional carbon-Michael donor in the presence of (3) a surfactant, (4) a carbon-Michael reaction catalyst and (5) a blowing agent composition containing a blowing agent that has a boiling temperature in the range −40° C. to +100° C., dispensing the partially expanded reaction mixture and curing the dispensed reaction mixture to form a polymer foam.

In certain preferred embodiments, the method comprises the following steps:

(a) forming a pressurized A-side component comprising a multifunctional Michael acceptor that has multiple Michael acceptor functionalities per molecule and, dissolved in the A-side component, a blowing agent composition containing a blowing agent that has a boiling temperature in the range −40° C. to +100° C.; wherein the A-side component has a Brookfield viscosity of 2,500 centipoises or less at 25° C.;

(b) separately forming a pressurized B-side component comprising a multifunctional carbon-Michael donor, a surfactant and, dissolved in the B-side component, a blowing agent composition containing a blowing agent that has a boiling temperature in the range −40° C. to +100° C.; wherein the B-side component has a Brookfield viscosity at 25° C. from 0.2 to 5 times that of the A-side component but not greater than 2,500 centipoises;

(c) separately depressurizing the pressurized A-side component and the pressurized B-side component such that the A-side component and the B-side component each at least partially expand due to expansion of blowing agent;

(d) combining the at least partially expanded A-side component and the at least partially expanded B-side component in the presence of a carbon-Michael reaction catalyst to form a reaction mixture; and (e) curing the reaction mixture to form the polymer foam.

In another aspect, this invention is a polymeric spray foam system comprising:

(a) an A-side component comprising a multifunctional Michael acceptor that has multiple Michael acceptor functionalities per molecule and, dissolved in the A-side component, a blowing agent composition containing a blowing agent that has a boiling temperature in the range −40° C. to +100° C.; wherein the A-side component has a Brookfield viscosity of 2,500 centipoises or less at 25° C.;

(b) a separate B-side component comprising a multifunctional carbon-Michael donor, a surfactant and, dissolved in the B-side component, a blowing agent composition containing a blowing agent that has a boiling temperature in the range −40° C. to +100° C.; wherein the B-side component has a Brookfield viscosity at 25° C. from 0.2 to 5 times that of the A-side component but not greater than 2,500 centipoises; and (c) a carbon-Michael reaction catalyst.

The invention provides a non-isocyanate foaming process and system which is suitable for use in spray foaming processes. The system is easily dispensable by spraying or other methods and, when so dispensed, can easily produce foam having a density of 40 kg/m³ or less. The foams often have specific compressive strengths of 3.5 kN·m/kg or greater, often greater than 5.0 kN·m/kg, while having mainly closed cells, typically 600 µm or less in size, and in certain embodiment 400 µm or less or even 200 µm or less in size.

For purposes of this invention, a "multifunctional Michael acceptor" is a compound that has multiple Michael acceptor functionalities per molecule. By "Michael acceptor functionality", it is meant an activated alkene having an aliphatic carbon-carbon double or triple bond alpha to a carbonyl (an "enone" group) or, less preferably, a nitro group. The multifunctional Michael acceptor has at least two, preferably 2 to 10, more preferably 2 to 6 and still more preferably 2 to 4 Michael acceptor functionalities. The preferred enone-containing Michael acceptors include compounds containing two or more (meth)acrylate residues. These preferred multifunctional Michael acceptors include compounds having two or more (meth)acrylate ester or (meth)acrylate amide groups.

The multifunctional Michael acceptor(s) may have an average equivalent weight per Michael acceptor functionality from 85 to 3,000 or more. In some embodiments, this average equivalent weight may be from 100 to 1,000. When producing a rigid foam, the average equivalent weight per Michael acceptor functionality may be from 100 to 500 or more preferably from 100 to 300.

Examples of suitable multifunctional Michael acceptor compounds include, for example, 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, propoxylated neopentyl glycol diacrylate, trimethylolpropane triacrylate, ethoxylated trimethylolpropane triacrylate, propoxylated trimethylolpropane, acryated polyester oligomer, bisphenol A diacrylate, acrylated bisphenol A diglycidylether, ethyoxylated bisphenol A diacrylate, tris(2-hydroxyethyl)isocyanurate triacrylate, an acrylated urethane oligomer, and the like. Also suitable are polymers having two or more acrylate or methacylate ester or amide groups.

In some embodiments, a mixture of multifunctional Michael acceptor compounds is present. Such a mixture may include, for example, up to 50% by weight of one or more difunctional Michael acceptor compounds, and at least 50% by weight one or more higher-functionality Michael acceptor compounds. Such a mixture of Michael acceptor compounds may contain 10 to 50%, preferably 15 to 40%, more preferably 15 to 35% and still more preferably 18 to 35% by weight of difunctional Michael acceptor compounds, the remainder being trifunctional or higher functionality Michael acceptor compounds. An especially preferred mixture is a mixture of a difunctional Michael acceptor compound with one or more tetrafunctional and/or hexafunctional Michael acceptor compounds, in which the difunctional materials constitute 18 to 35 weight-% of the mixture.

For purposes of this invention, a "multifunctional carbon-Michael donor" is a material that contains one or more carbon-Michael donor functionalities and can react with two or more carbon-Michael acceptor functionalities to form a carbon-carbon bond to each of the carbon-Michael acceptor functionalities. Michael donor functionalities for purposes of this invention are groups that in the presence of a carbon-Michael reaction catalyst form a carbanion that reacts with the carbon-carbon double or triple bond of a Michael acceptor group to form a carbon-carbon bond to the Michael acceptor group. Suitable Michael donor functionalities include two or more β-diketo and β-cyanoketo moieties, i.e., moieties represented by the structures:

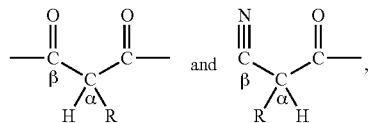

respectively. Among the suitable carbon Michael donors having β-diketo moieties are compounds containing one or more acetoacetate ester, acetoacetamide, and/or malonate mono- or diester groups. Among the suitable carbon Michael donors having β-cyanoketo moieties are compounds containing one or more cyanoacetate ester and/or cyanoacetamide groups.

Some carbon-Michael donor functionalities can react difunctionally with carbon-Michael acceptor functionalities. Examples of such functionalities include β-diketo and β-cyanoketo moieties such as those having the structures above, in which R is hydrogen. In such a case, it is only necessary that one carbon-Michael donor functionality be present on the multifunctional carbon-Michael donor. If the carbon-Michael donor functionality is only capable of reacting with a single carbon-Michael acceptor functionality (as is the case when R is other than hydrogen in the structures below), the carbon-Michael donor needs to have at least two carbon Michael donor functionalities per molecule. In either case, the multifunctional carbon Michael donor may have 2 to 10, preferably 2 to 6 and more preferably 2 to 4 carbon Michael donor functionalities per molecule.

Examples of useful multifunctional carbon-Michael donors include acetoacetate esters, cyanoacetate esters and malonic acid esters of polyhydric alcohols such as ethylene glycol, 1,2- or 1,3-propane diol, 1,4-butane diol, 1,2-butanediol, 1,6-hexanediol, neopentyl glycol, 2-methyl-1,3-propane diol, diethylene glycol, triethylene glycol, dipropylene glycol, tripropylene glycol, poly(propylene glycol), poly(ethylene glycol), cyclohexanedimethanol, trimethylol propane, triethylol propane, pentaerythritol, glycerin, glycerol, dipentaerythritol, di-trimethylolpropane, glucose, isosorbide, butyl ethyl propanediol and the like. Acetoacetate-functional or cyanoacetate-functional polyethers, polyesters or polyesteramides are also useful.

The multifunctional Michael donor(s) may have an average equivalent weight per Michael donor functionality from 85 to 3,000 or more. In some embodiments, this average equivalent weight may be from 100 to 1,000. When producing a rigid foam, the average equivalent weight per Michael donor functionality may be from 100 to 500 or more preferably from 100 to 300.

Additional examples of useful multifunctional carbon-Michael donors include acetoacetamides and cyanoacetamides of amine compounds having two or more amine hydrogen atoms such as ethylene diamine, triethylene diamine, tetraethylene triamine, piperazine, isophorone diamine, hexamethylene diamine, 1,4-butane diamine, diethyltoluenediamine, phenylene diamine, various polymeric polyamines, and the like. Acetoacetamide-functional and cyanoacetamide-functional polyethers, polyesters or polyesteramides are also useful.

The amounts of Michael acceptor and carbon-Michael donor compounds preferably are selected to provide at least one mole of Michael acceptor functionalities(s) per mole of carbon-Michael donor functionalities. This ratio preferably is no greater than 3 moles of Michael acceptor functionalities per mole of multifunctional carbon-Michael donor functionalities, particularly in the case in which the carbon-Michael donor reacts difunctionally with the carbon-Michael acceptor. A preferred ratio is from 1.2 to 2.5:1 and a still more preferred ratio is from 1.4 to 2.1:1.

The surfactant is a material that stabilizes gas bubbles that form as the blowing agent composition expands, and helps prevent the gas bubbles from collapsing until the polymer has cured. Desirable surfactants include polyalkylene oxides and silicone based interfacial agents. Polyalkylene oxides comprise random or block copolymers of ethylene and propylene oxides or ethylene and butylenes oxides. One desirable surfactant is a polyethylene oxide-co-butylene oxide triblock organic surfactant with equivalent weight of approximately 3400 and nominal viscosity of approximately 3300 centipoises sold under the tradename VORASURF™ 504 (The Dow Chemical Company). Examples of useful organosilicone surfactants include polysiloxane/polyether copolymers such as Tegostab™ (Evonik Industries), B-8462 and B8469, DABCO™ DC-198 surfactant (Air Products and Chemicals), and Niax™ L-5614 surfactant (Momentive Performance Products).

The concentration of surfactant may range from zero up to 5% of the total weight of the system. The surfactant may be pre-blended into either an A-side component that contains the multifunctional Michael acceptor compound(s), a B-side component that contains the multifunctional carbon-Michael donor compound, or both. Desirably, the concentration of surfactant is at least 0.1 weight-percent of the total system, preferably at least 0.5 wt-% or more, still more preferably 1.25 wt% or more, up to 5.0 wt-%, more preferably up to 2.5 wt-%.

The blowing agent composition including at least one blowing agent that has a boiling temperature (at one atmosphere pressure) in the range −40° C. to +100° C.

In certain embodiments, the blowing agent composition contains at least one blowing agent that has a boiling temperature in the range −40° C. to +10° C. Hydrocarbons, alkylethers, fluorocarbons, hydrofluoro olefins and hydrofluorocarbons having boiling temperatures within this range are preferred. Examples of such blowing agents include propane, isobutene, n-butane, dimethylether, R-32, R-125, R-152a, R-227ea, R-236fa, R-142b, R-134a, perfluorobutane, perfluoropropane, R-1234yf from DuPont, R-1234ze (Honeywell) or mixtures such as Suva™ 407C (DuPont) a mixture of R-32, R-125 and R-134a, with R-134a being a preferred type.

In other embodiments, the blowing agent composition includes (instead or in addition to a blowing agent as just described), a blowing agent that has a boiling temperature (at 1 atmosphere pressure) of greater than 10° C. and up to 100° C., preferably up to 70° C., and especially from 15° C. to 70° C. When used in conjunction with a lower boiling point blowing agent, the presence of this higher-boiling blowing agent often allows the foam to continue to expand after the initial expansion that is caused by the first, lower-boiling blowing agent. The high-boiling blowing agent typically requires an elevated temperature to volatilize and expand. The elevated temperature may be supplied through applied heat, but often is due to the heat generated by the exothermic reaction of the multifunctional Michael acceptor with the Michael donor. As before, hydrocarbons, alkylethers, fluorocarbons, hydrofluoro olefins and hydrofluorocarbons having boiling temperature within this range are preferred. Examples of such second blowing agents include, for example, n-pentane, 1,1,2,2,3-pentafluoropropane, 1,1,1,3,3-pentafluoropropane (R-245fa), 1,1,1,3,3-pentafluorobutane, perfluoropentane, R-1233Zd™ from Honeywell, R-1336m/z from DuPont, blends of the same, blends of low and high boiling materials such as Solkane™ 365/227 from Solvay, and the like, with R-245fa being a preferred type in combination with R-134a.

The blowing agent composition will typically constitute from 5 to 35% by weight of the total weight of the system. A preferred amount is from 8 to 30% and a still more preferred amount is from 12 to 25%. The blowing agent(s) that have a boiling temperature of from −40° C. to +10° C., preferably −40° C. to 0° C. preferably by itself constitutes at least 5% by weight of the system. The higher boiling blowing agent, if present, preferably constitutes from 1 to 15, more preferably from 3 to 8% of the total system weight. In certain embodiments of the invention, the blowing agent composition is pre-blended in an A-side component that includes the multifunctional Michael acceptor compound(s). In other embodiments, the blowing agent composition is pre-blended in a B-side component that includes the multifunctional carbon-Michael donor compound(s). In yet other embodiments, a portion of the blowing agent composition is pre-blended in an A-side component that includes the multifunctional Michael acceptor compound, and another party of the blowing agent composition is pre-blended in a B-side component that includes the multifunctional carbon-Michael donor compound(s). Any blowing agent composition that is pre-blended in the A-side component should be soluble therein. Any blowing agent composition that is pre-blended in the B-side component should be soluble therein.

Suitable carbon-Michael reaction catalysts include basic compounds such as described, for example, in US Published Patent Application No. 2005-0081994. Among the useful reaction catalysts include tertiary amine compounds, amidine compounds, quaternary ammonium hydroxides, alkali metal hydroxides, alkali metal alkoxides, alkali metal acetylacetonates, quaternary ammonium acetylacetonates and the like. Tertiary amine and amidine compounds are often preferred. Some suitable amidine compounds include, for example, guanidine and cyclic amidine compounds such as, for example, N,N,N',N'-tetramethylguanidine (TMG), 1,8-diazabicyclo[5.4.0]undec-7-ene (DBU) and 1,5-diazabicyclo[4.3.0]non-5-ene (DBE). Among the suitable ammonium compounds are, for example, quaternary ammonium hydroxides such as, for example, tetramethyl ammonium hydroxide, tetraethyl ammonium hydroxide, tetrabutyl ammonium hydroxide, and tetraoctyl ammonium hydroxide. Some suitable amine compounds are, for example, trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl)amino-ethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine) ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

A catalytic amount of the carbon-Michael reaction catalyst is present during the curing step. A suitable amount is from 0.01 to 1, preferably from 0.1 to 0.5 and preferably 0.1 to 0.25 moles of carbon-Michael reaction catalyst per equivalent of carbon-Michael donor functionalities, although optimum amounts in any specific case may depend on the particular catalyst. Certain amine and amidine catalysts may tend to increase the viscosity of the B-side component significantly if present therein in amounts greater than about 0.25 moles of catalyst per equivalent of multifunctional carbon-Michael donor.

The reaction mixture may contain optional ingredients such as one or more plasticizers, one or more fillers, one or more colorants, one or more preservatives, one or more odor masks, one or more flame retardants, one or more biocides, one or more antioxidants, one or more UV stabilizers, one or more antistatic agents, one or more foam cell nucleators, and the like.

Useful flame retardants include brominated types, phosphorus-containing types, and combinations thereof. Among the useful brominated flame retardants are a tetrabromophthalate diester/ether diol such as that marketed by Albemarle Corporation as Saytex™ RB79 or that marketed by Chemtura Corporation as PHT-4-diol, tetrabromobisphenol A, brominated polystyrene, brominated styrene-butadiene polymers, brominated epoxy resins, brominated alkanes such as 1-bromopropane, a brominated polymer such as that marketed by Chemtura as Emerald 3000, or brominated acrylic monomer or polymer thereof.

Among the useful phosphorus-containing flame retardants are various phosphinate, phosphate and phosphonate compounds such as aluminum diethyl phosphinate, tris(2-chloropropyl)phosphate, triethyl phosphate, poly(m-phenylene methylphosphonate), oligomeric ethyl ethylene phosphate, resorcinol bis(diphenyl phosphate) and bisphenol A bis (diphenyl phosphate).

It has been found that the performance of the foam on burning tests correlates with the glass transition temperature when a flame retardant is present. Foams with flame retardants that have glass transition temperatures below about 80° C. tend to perform worse on those burning tests than when the foam has a glass transition temperature of 80° C. or greater. Therefore, in preferred embodiments, the foam of the invention contains at least one phosphorus- and/or bromine-containing flame retardant and has a glass transition temperature of at least 80° C. The flame retardant may provide the foam with at least 0.5%, preferably 0.75 to 5% by weight phosphorus and/or from 1 to 10%, preferably 2 to 7% by weight bromine.

The reaction mixture should contain no more than 0.25% by weight of isocyanate compounds, and preferably is devoid thereof.

In a particular aspect, the invention is a polymeric spray foam system comprising (a) an A-side component comprising a multifunctional Michael acceptor that has multiple Michael acceptor functionalities per molecule and, dissolved in the A-side component, a blowing agent composition containing a blowing agent that has a boiling temperature in the range −40° C. to +10° C.; wherein the A-side component has a Brookfield viscosity of 2,500 centipoises or less at 25° C.;

(b) a separate B-side component comprising a multifunctional carbon-Michael donor, a surfactant and, dissolved in the B-side component, a blowing agent composition containing a blowing agent that has a boiling temperature in the range −40° C. to +10° C.; wherein the B-side component has a Brookfield viscosity at 25° C. from 0.2 to 5 times that of the A-side component but not greater than 2,500 centipoises; and (c) a carbon-Michael reaction catalyst.

In specific embodiments of the spray foam system are characterized by having the following features, which can be present singly or in any combination of two or more:

A. The A-side and B-side components each being pressurized, especially wherein the A-side and the B-side components each are pressured with a propellant gas that has a solubility of less than 3,000 weight-parts per million weight-parts of the respective component.

B. The multifunctional Michael acceptor is a polyacrylate and the multifunctional carbon-Michael donor is at least one compound that contains one or more β-diketo or β-cyanoketo groups.

C. The multifunctional carbon-Michael donor contains two or more acetoacetate, cyanoacetate, acetoacetamide or malonate groups.

D. The multifunctional Michael acceptor is a mixture of at least one difunctional acrylate compound and at least one tetrafunctional acrylate compound.

E. The multifunctional Michael donor contains two or more acetoacetate groups.

F. The blowing agent in one or both of the A-side component and B-side component further contains at least one blowing agent has a boiling temperature above 10 degrees Celsius and below 70 degrees Celsius.

G. The surfactant in the B-side component is a silicone surfactant.

H. The A-side component includes a surfactant.

I. The A-side component has a Brookfield viscosity of 1000 cPs or less.

J. At least one phosphorous-containing compound, at least one bromine-containing compound, or both, is present in the A-side component, the B-side component or both the A-side and B-side components.

K. The carbon-Michael reaction catalyst is contained in the A-side component, the B-side component or both the A-side and B-side components.

L. The carbon-Michael reaction catalyst is a tertiary amine compound.

Polymer foam is made in accordance with an aspect of the invention by forming an at least partially expanded reaction mixture by combining, at a temperature of at least 10° C., (1) a multifunctional Michael acceptor that has multiple Michael acceptor functionalities per molecule with (2) a multifunctional carbon-Michael donor in the presence of (3) a surfactant, (4) a carbon-Michael reaction catalyst and (5) a blowing agent composition containing a blowing agent that has a boiling temperature in the range −40° C. to +10° C., dispensing the partially expanded reaction mixture and curing the dispensed reaction mixture to form a polymer foam.

The partially expanded reaction mixture can be prepared in various ways. In one embodiment, the multifunctional Michael acceptor and the multifunctional carbon-Michael donor are brought together in the presence of the surfactant, catalyst and blowing agent composition, and then partially expanded, dispensed and then cured. In this embodiment, the surfactant, catalyst and/or blowing agent composition may be pre-blended with either the multifunctional Michael acceptor (to form a formulated A-side component) or the multifunctional carbon-Michael donor (to form a formulated B-side component), or into each of them, prior to bringing the Michael acceptor and carbon-Michael donor together. The multifunctional Michael acceptor and multifunctional carbon-Michael donor may each be at least partially expanded prior to bringing them together. Alternatively, the expansion may not occur until after the Michael acceptor and carbon-Michael donor are combined.

The partial or full expansion is conveniently achieved through adjusting temperature and pressure conditions such that at least some of the blowing agent component forms a gas. Preferably, the temperature during the expansion step is at least 10° C. and may be as much as 100° C. A preferred temperature is from 20 to 50° C. and a more preferred temperature is from 20 to 40° C. The blowing agent component, whether added as a separate stream or formulated into an A-side and/or B-side component, typically is pressurized to maintain it as a liquid until such time as expansion (of the reaction mixture or A- or B-side components, as the case may be) is desired, at which time the blowing agent component is depressurized to allow some or all of it to volatilize and perform the expansion.

The expansion forms a frothy reaction mixture in which gas bubbles are entrained. The density of the frothy reaction mixture that is formed is generally less than 700 kg/m$^3$, preferably less than 500 kg/m$^3$ and more typically less than 250 kg/m$^3$. The froth density may be as low as 100 kg/m$^3$, as low as 50 kg/m$^3$, as low as 25 kg/m3, or even lower.

The process may be performed continuously, by continuously bringing the multifunctional Michael acceptor and multifunctional carbon-Michael donor together in the presence of the other ingredients (which may be pre-blended into either or both of the Michael acceptor and carbon-Michael donor) at a temperature above 10° C. and continuously dispensing the resulting at least partially expanded reaction mixture onto a substrate. The substrate in such cases may be, for example, a polymer film, Kraft paper, metallized polymeric film, metal film, plywood or other wood product, cardboard, fiber mat (including, for example, a mat of continuous rovings, woven fibers, or non-woven fibers), and the like. Such a continuous process is useful for making boardstock products that may have thicknesses, for example, from 12 to 150 mm, especially from 25 to 150 mm.

The combining step can be performed using any suitable mixing equipment, including static mixing equipment, impingement mixing equipment, or other suitable mixing equipment.

The curing step is exothermic and typically proceeds spontaneously at room temperature or slightly elevated (up to 50° C.). Therefore, it is usually not necessary to apply heat to the reaction mixture to effect the cure. However, heating may be applied if a faster cure is wanted. Curing temperatures of up to 100° C. or more can be used. Curing to a tack-free state generally takes place in a matter of a few minutes.

A preferred foaming process include the following steps:

(a) forming a pressurized A-side component comprising a multifunctional Michael acceptor that has multiple Michael acceptor functionalities per molecule and, dissolved in the A-side component, a blowing agent composition containing a blowing agent that has a boiling temperature in the range −40° C. to +100° C.; wherein the A-side component has a Brookfield viscosity of 2,500 centipoises or less at 25° C.;

(b) separately forming a pressurized B-side component comprising a multifunctional carbon-Michael donor, a surfactant and, dissolved in the B-side component, a blowing agent composition containing a blowing agent that has a boiling temperature in the range −40° C. to +100° C.; wherein the B-side component has a Brookfield viscosity at 25° C. from 0.2 to 5 times that of the A-side component but not greater than 2,500 centipoises;

(c) separately depressurizing the pressurized A-side component and the pressurized B-side component such that the A-side component and the B-side component each at least partially expand due to expansion of blowing agent;

(d) combining the at least partially expanded A-side component and the at least partially expanded B-side component in the presence of a carbon-Michael reaction catalyst to form a reaction mixture; and (e) curing the reaction mixture to form the polymer foam.

In steps (a) and (b), the A-side component and B-side-components are pressurized enough to maintain the blowing agent composition as a liquid that is in each case dissolved in the respective component (although a small amount thereof may be present as a vapor in any head space as may exist in the container which holds the pressurized A-side or B-side component). A higher pressure than is minimally necessary may be applied in steps (a) and/or (b) as, for example, in the case where the applied pressure supplies force to dispense the component(s) from their container in step (c). The requisite pressure may be applied mechanically. In certain applications, such as some spraying applications, the requisite pressure is supplied by enclosing the A-side or B-side component in a closed container that is pressurized with a propellant gas. The propellant gas is typically a material that (1) is a gas under the conditions of steps (a) or (b), as the case may be and (2) is not reactive with the A-side component or B-side component, as the case may be, under the conditions that exist in step (a). It preferably also (3) has a solubility at 25° C. of less than 3,000 weight-parts per million weight-parts in the respective component. Examples of suitable propellant gasses include air, nitrogen, argon, helium, and the like.

In steps (a) and (b), the pressure to which the respective A-side and B-side components are pressurized may be, for example, at least 340 kiloPascals gauge (kPag), at least 500 kPag or, more preferably, at least 650 kPag. Any higher pressure can be used, but it is usually unnecessary to pressurize the components to pressures greater than 2000 kPag, and a preferred upper limit is 1400 kPag and a still more preferred upper limit is 1000 kPag. The A-side and the B-side components do not have to be pressurized to the same pressure.

In step (c) the pressurized A-side component and the pressurized B-side component are separately depressurized. This can be done by simply releasing the pressure in the respective containers and allowing the components to at least partially expand within their respective containers. A more preferred way of performing step (c) is to expel the components from their container into an area of lower pressure. The lower pressure is low enough that at least the blowing agent having a boiling temperature from −40° C. to 10° C. volatilizes and at least partially expands the respective components. The reduced pressure is commonly atmospheric pressure, but may be subatmospheric and in some case may even be somewhat superatmospheric.

The temperature during step (c) should be greater than +10° C., and may be as much as 100° C. A preferred temperature is from 20 to 50° C. and a more preferred temperature is from 20 to 40° C.

Upon depressurizing the A-side and B-side components in step (c), they each at least partially expand due to expansion of blowing agent. The expansion that occurs during this step forms in each case a frothy liquid in which gas bubbles are entrained in a two-phase liquid. The densities of the separate froth(s) that are formed are each generally less than 700 kg/m$^3$, preferably less than 500 kg/m$^3$ and more typically less than 250 kg/m$^3$. The froth densities each may be as low as 100 kg/m$^3$, as low as 50 kg/m$^3$, as low as 25 kg/m$^3$ or even lower.

In step (d), the at least partially expanded A-side component and the at least partially expanded B-side component formed in step (c) are combined in the presence of a carbon-Michael reaction catalyst to form a reaction mixture. The carbon-Michael reaction catalyst preferably is contained in either the pressurized A-side component or pressurized B-side component, or both, but it is possible to introduce the carbon-Michael reaction catalyst as a separate stream during step (d). If introduced as a separate stream, the carbon-Michael reaction catalyst may be dissolved in a carrier, which may be, for example, more of the multifunctional Michael acceptor or more of the multifunctional carbon-Michael donor. It is usually preferred to incorporate the reaction catalyst into the B-side component. In some cases, the presence of the carbon-Michael reaction catalyst in the A-side component may cause some loss in storage stability, and so it is preferred to exclude the catalyst from the A-side component, especially if the A-side component is to be stored for long periods before it is used.

An A-side component preferably is formulated to have a Brookfield viscosity of no greater than 2,500 cps at 25° C. The A-side component preferably has a Brookfield viscosity of no greater than 1,000 cps, more preferably no more than 750 cps, and still more preferably no more than 500 cps, again at 25° C. The Brookfield viscosity is conveniently measured using a #31 spindle at 50 rpm.

An A-side component for use in the preferred process typically will contain from 5 to 35% by weight of the blowing agent composition. A preferred amount is from 8 to 30% and a still more preferred amount is from 12 to 25%. The A-side component preferably contains at least 5% by weight of the soluble blowing agent(s) that have a boiling temperature of from −40° C. to +10° C. The higher boiling blowing agent, if present, preferably constitutes from 1 to 15, more preferably from 3 to 8% of the weight of the A-side component.

A B-side component preferably is formulated to have a Brookfield viscosity at 25° C. from 0.2 to 5 times that of the A-side component, but not more the 2,500 centipoises (cps). It is preferred that the Brookfield viscosity of the B-side component is not greater than 1000 cps, more preferably not greater than 700 cps and still more preferably no more than 500 cps at 25° C.

A B-side component for use in the preferred process typically will contain from 5 to 35% by weight of the blowing agent composition. A preferred amount is from 8 to 30% and a still more preferred amount is from 12 to 25%. The B-side component preferably contains at least 5% by weight of the soluble blowing agent(s) that have a boiling temperature of from −40° C. to +10° C., preferably −40° C. to 0° C. The higher boiling blowing agent, if present, preferably constitutes from 1 to 15, more preferably from 3 to 8% of the weight of the B-side component.

The ratios of at least partially expanded A-side and B-side components that are combined in step (d) of the preferred process preferably are selected to provide at least one mole of Michael acceptor functionalities(s) per mole of carbon-Michael donor functionalities. This ratio preferably is no greater than 3 moles of Michael acceptor functionalities per mole of multifunctional carbon-Michael donor functionalities, particularly in the case in which the carbon-Michael donor reacts difunctionally with the carbon-Michael acceptor. A preferred ratio is from 1.2 to 2.5:1 and a still more preferred ratio is from 1.4 to 2.1:1.

In some embodiments, steps (a)-(d) are performed using spray foam equipment. The spray foam equipment includes separate containers for each of the pressurized A-side and pressured B-side components. The containers preferably are pressured with a propellant gas as described before. The containers are each in fluid connection with a separate conduit, which each are in fluid communication with a mixing chamber which in turn is in fluid communication with a nozzle. Upon opening the containers (via the opening of a suitable valve in each of the containers), the A-side component and B-side component each are dispensed from their containers under pressure of the propellant gas into the respective conduits, where the components at least partially expand as described before. The partially expanded A-side and B-side components are then brought to the mixing chamber, typically under pressure from the propellant gas, and combined to form a reaction mixture. The mixing device is preferably a static mixer or other mixhead. The reaction mixture is then expelled through a nozzle or other orifice, again typically still under the pressure of the propellant gas. The expelled reaction mixture typically forms a spray or a foam bead, depending in part on the nozzle size and type and the viscosity of the exiting material, which is directed to a mold or other surface upon which the polymeric foam is to be applied. The reaction mixture is then cured.

Suitable spray foam equipment includes that described, for example, in U.S. Pat. No. 6,991,185, U.S. Pat. No. 4,925,107, U.S. Pat. No. 5,944,259, U.S. Pat. No. 5,129,581, U.S. Pat. No. 5,021,961 and US Published Patent Application No 2004-0109992. A suitable commercially available spray foam system is marketed by Dow Building Solutions, Midland, Mich. US under the brand name "Froth-Pak"™.

Foams made in accordance with the invention are useful in a variety of sealing and insulation applications. These include, for example, building insulation such as for walls, foundations, floors and roofs; gap and crack filling and crack repair applications in buildings, masonry and other structures; vehicular cavity-filling applications, and the like. The foams are also useful in producing boardstock insulation and/or construction materials by spraying or applying the uncured foam onto a facing material (such as, for example, a fiber layer, a wood or metal layer, and the like, gauging the foam to a desired thickness and curing the foam, as described, for example, in U.S. Reissue Pat. No. 36,674.

The following examples are intended to illustrate the invention, but not to limit the scope thereof. All parts and percentages are by weight unless otherwise indicated. The ingredients described in the following examples are as follows:

The "tetrafunctional acrylate" is a ditrimethylolpropane tetraacrylate marketed by Sartomer Corporation as SR355.

"Difunctional acrylate A" is a bisphenol A epoxy diacrylate marketed by Sartomer Corporation as CN120Z.

"Difunctional acrylate B" is a bisphenol A glycerolate (1 glycerol/phenol)diacrylate (BAGDA) from Sigma-Aldrich Corporation.

The "hexafunctional acrylate" is an aromatic urethane hexaacrylate oligomer marketed by Sartomer Corporation as CN997.

"CN2601" is a brominated aromatic acrylate oligomer available from Sartomer Corporation.

The surfactant is an organosilicone marketed as Tegostab™8469 by Evonik Industries.

"HFC 245fa" is 1,1,1,3,3-pentafluoropropane, marketed by Honeywell Corporation

"HFC 134a" is 1,1,1,2-tetrafluoroethane, marketed by Honeywell Corporation.

"HCFO-1233zd(E)" is trans-1-chloro-3,3,3-trifluoropropene, marketed under the brand name Solstic Liquid Blowing Agents by Honeywell Corporation.

"HFO-1234ze" is trans-1,3,3,3-tetrafluoropropene, marketed under the brand name Solstice Propellant by Honeywell Corporation.

"TMP trisAcac" is trimethylolpropane tris(acetoacetonate) marketed as LONZAMON AATMP by Lonza.

"GlytrisAcac" is glycerin tris(acetylacetonate).

"TMG" is N,N,N',N'-tetramethylguanidine, from Sigma-Aldrich Corporation.

"DBU" is "1,8-Diazabicyclo[5.4.0]undec-7-ene" from Sigma-Aldrich Corporation "TCPP" is tri(2-chloropropyl) phosphate, marketed by Shekoy Chemicals.

"Fyroflex BDP" is Bisphenol A bis(diphenyl phosphate) marketed by ICL Supresta, Inc.

"Brominated FR" is a tetrabromophthalate diol such as that sold by Chemtura Corporation as PHT4-Diol.

"TEP" is triethyl phosphate from Anhui Tech.

"A-46" is a blend of 85 weight % isobutene and 15 weight % propane.

EXAMPLES 1-7 AND COMPARATIVE SAMPLE A

An A-side formulation for Example 1 is prepared by mixing the following ingredients:

| Ingredient | Parts By Weight |
| --- | --- |
| Tetrafunctional acrylate | 30.04 |
| Difunctional acrylate A | 10.94 |
| Surfactant | 0.91 |
| HFC 245fa | 1.97 |
| HFC 134a | 9.41 |
| Total | 53.27 |
| Weight ratio, difunctional acrylate/tetrafunctional acrylate | 26.7:73.3 |

The Brookfield viscosity of this A-side component is about 500 cps. This material is charged to the A-side canister of a 17-gallon Froth-Pak™ refill system. The tank is pressurized with nitrogen to a gauge pressure of 485 kPag.

A B-side component for Example 1 is made by blending the following ingredients:

| Ingredient | Parts By Weight |
| --- | --- |
| TMP trisAcac | 32.26 |
| TMG | 2.21 |
| TCPP | 2.09 |
| Triethyl phosphate | 0.43 |
| Surfactant | 0.79 |
| HFC 245fa | 1.19 |
| HFC 134a | 7.62 |
| Total | 46.73 |

The Brookfield viscosity of this A-side component is about 550 cps. This material is charged the B-side canister of a 17-gallon Froth-Pak™ refill system. The tank is pressurized with nitrogen to a gauge pressure of 478 kPag.

The temperatures of the A-side and B-side components are brought to 20-25° C., and dispensed. In the Froth-Pak system, each of the canisters is connected to a mixhead via a separate conduit. Upon operation, the contents of each canister are dispensed under pressure of the propellant gas through their separate conduits. The partially expanded materials then enter a mixhead where they each partially expand before becoming combined with each other to form a reaction mixture which is expelled through a nozzle. The sprayed reaction mixture is delivered into an open mold to a depth of about 13 mm and allowed to cure at room temperature. The reaction mixture expands to a depth of about 50 mm as it cures. The gel time and tack free time are determined by periodically touching the surface of the reaction mixture with a wooden slat and removing the slat. The gel time is the time after dispensing at which strings form when the slat is removed. The tack-free time is the time after dispensing at which strings no longer form. After complete curing, the foams are aged for 24 hours at 23° C./50% relative humidity, and then foam density, open cell content, compression strength, and specific compression strength are measured. Foam density is measured according to ASTM D-1622-03. Open cell content and compressive strength are measured according to ASTM D6226-10 and ASTM D1621-10, respectively. Results are as indicated in Table 2 below.

Examples 2-7, Comparative Sample A, B and C are made and tested in the same manner. The formulations for each of Examples 2-7 and Comparative Sample A, B and C are indicated in Table 1 below. Results of the testing are as indicated in Table 2 below.

Comparative Sample B was prepared using the formulation of U.S. Pat. No. 7,919,540 in the same manner as for the other examples. Cyclopentane was used as a liquid blowing agent. Because the diacrylate monomer, Morecure™ 2000, is not commercially available from Rohm and Hass Corporation, a diacrylate (BAGDA) with identical CAS number and reported physical properties, obtained from Sigma-Aldrich Corporation, was substituted. Current Comparative A is similar to Comparative B except that the blowing agent type and the ratio of other raw materials was changed from that cited in U.S. Pat. No. 7,919,540. The A-side and B-side both required nitrogen pressure to be dispensed from the cans but did not froth. Comparative C was similar to Comparative B but a hydrocarbon gaseous blowing agent was added to force the material to froth. Comparative C cell size was very large compared to the examples of the invention.

TABLE 1

| Ingredient | A* | B* | C* | Ex. 1 | Ex. 2 | Ex. 3 | Ex. 4 | Ex. 5 | Ex. 6 | Ex. 7 |
| --- | --- | --- | --- | --- | --- | --- | --- | --- | --- | --- |
| | | | | | | Parts by weight | | | | |
| A-side | | | | | | | | | | |
| Tetrafunctional acrylate | 37.17 | 21.23 | 22.16 | 30.04 | 37.89 | 36.56 | 32.43 | 42.06 | 32.71 | 27.17 |
| Difunctional acrylate A | 13.54 | 0 | 0 | 10.94 | 13.80 | 13.32 | 11.81 | 10.51 | 8.18 | 13.58 |
| Difunctional acrylate B | 0 | 31.84 | 33.24 | 0 | 0 | 0 | 0 | 0 | 0 | 0 |
| Surfactant | 1.12 | 0.60 | 2.43 | 0.91 | 1.14 | 1.10 | 0.98 | 1.18 | 0.92 | 0.89 |
| HFC 245fa | 2.44 | 0 | 0 | 1.97 | 3.45 | 3.33 | 2.95 | 3.51 | 2.73 | 2.72 |
| HFC 134a | 11.59 | 0 | 0 | 9.41 | 11.86 | 11.44 | 10.15 | 12.06 | 9.38 | 9.34 |
| Cyclopentane | 0 | 6.00 | 2.77 | 0 | 0 | 0 | 0 | 0 | 0 | 0 |
| A46 blowing agent | 0 | 0 | 7.34 | 0 | 0 | 0 | 0 | 0 | 0 | 0 |
| Total | 65.86 | 59.68 | 67.95 | 53.27 | 68.15 | 65.75 | 58.33 | 69.32 | 53.91 | 53.70 |

TABLE 1-continued

| Ingredient | A* | B* | C* | Ex. 1 | Ex. 2 | Ex. 3 | Ex. 4 | Ex. 5 | Ex. 6 | Ex. 7 |
|---|---|---|---|---|---|---|---|---|---|---|
| | | | | | | | Parts by weight | | | |
| Weight ratio, di/tetra acrylate | 26.7:73.3 | 60.0:40.0 | 60.0:40.0 | 26.7:73.3 | 26.7:73.3 | 27.6:73.3 | 26.7:73.3 | 20:80 | 20:80 | 20:80 |
| A-side pressure, kPag | 485 | 1113 | 1160 | 485 | 496 | 469 | 481 | 460 | 478 | 461 |
| B-side | | | | | | | | | | |
| TMP trisAcac | 24.12 | 38.63 | 23.80 | 32.26 | 21.87 | 23.51 | 25.37 | 18.25 | 27.41 | 25.98 |
| TMG | 1.61 | 1.70 | 3.25 | 2.21 | 2.49 | 2.67 | 3.25 | 1.64 | 2.46 | 4.44 |
| TCPP | 1.56 | 0 | 0 | 2.09 | 1.41 | 1.52 | 1.59 | 1.46 | 2.19 | 2.19 |
| Triethyl phosphate | 0.47 | 0 | 0 | 0.43 | 0.57 | 0.39 | 0.41 | 0.44 | 0.40 | 5.03 |
| Brominated FR | 0 | 0 | 0 | 0 | 0 | 0 | 3.65 | 3.35 | 5.03 | 5.03 |
| Surfactant | 0 | 0.00 | 0.67 | 0.79 | 0.53 | 0.57 | 0.62 | 0.48 | 0.72 | 0.68 |
| HFC 245fa | 0.85 | 0.00 | 0 | 1.19 | 0 | 0 | 0 | 0 | 0 | 0 |
| HFC 134a | 5.57 | 0.00 | 0 | 7.62 | 5.16 | 5.55 | 6.75 | 5.11 | 7.67 | 7.36 |
| Cyclopentane | 0 | 0 | 1.19 | 0 | 0 | 0 | 0 | 0 | 0 | 0 |
| A46 blowing agent blend | 0 | 0 | 03.15 | 0 | 0 | 0 | 0 | 0 | 0 | 0 |
| Total | 34.14 | 40.32 | 32.05 | 46.73 | 31.85 | 34.25 | 41.67 | 30.68 | 46.09 | 46.30 |
| B-side pressure, kPag | 478.5 | 440 | 1160 | 499 | 414 | 414 | 480 | 454 | 480 | 925 |
| Equivalent ratio, acrylates:TMP acac | 2.00 | 1.05 | 1.39 | 1.21 | 2.25 | 2.02 | 1.66 | 2.85 | 1.48 | 1.43 |
| Equivalent ratio, TMG:TMP acac | 0.074 | 0.049 | 0.152 | 0.077 | 0.127 | 0.127 | 0.143 | 0.100 | 0.100 | 0.191 |

*Not an example of this invention. "kPag" is gauge pressure in kPa.

TABLE 2

| | Result | | | | | | | | | |
|---|---|---|---|---|---|---|---|---|---|---|
| Property | Comp. A* | Comp B* | Comp C*[3] | Ex. 1 | Ex. 2 | Ex. 3 | Ex. 4 | Ex. 5 | Ex. 6 | Ex. 7 |
| Gel time, s | NA[1] | 150 | 240 | 220 | 180 | 165 | 110 | 330 | 240 | 130 |
| Tack-free time, s | NA | 240 | 360 | 270 | 250 | 230 | 140 | 510 | 315 | 160 |
| Density, kg/m$^3$ | NA | LQ[2] | 27.2 | 28.8 | 28.8 | 32.0 | 35.2 | 33.6 | 33.6 | 33.6 |
| Open cell content, % | NA | LQ | 77.3 | 38 | 11 | 10 | 21 | 16 | 30 | 39 |
| Compressive strength, kPa | NA | LQ | NA | 152 | 159 | 172 | 193 | 138 | 172 | 138 |
| Specific Compressive strength, kN · m/kg | NA | LQ | NA | 5.26 | 5.50 | 5.38 | 5.48 | 4.10 | 5.12 | 4.10 |

*Not an example of this invention.
[1]NA—not applicable; Comparative sample A collapsed and did not produce a foam.
[2]LQ—Low quality; Comparative sample B foamed but cracked so that properties could not be determined.
[3]Comparative Sample C foams to give very large cells, approximately 0.37 mm in diameter compared to a typical cell size of less than 0.25 mm.

As can be seen from the foregoing, the absence of surfactant from the B-side component in conjunction with low catalyst level leads to foam collapse in Comparative Sample A, even though surfactant is present in the A-side component. Neither of the A side or the B side of Comparative Sample B form a stable froth. Despite the presence of a low viscosity blowing agent (cyclopentane) in the side A of Comparative Sample B, its viscosity is still too high to be sprayed smoothly, even at a high pressure compared to that used in Examples 1-7. Comparative Sample B forms low quality foams having large cracks. Only marginally better results are obtained with Comparative Sample C. The cell size of Comparative Sample C is very large compared to the examples of the invention. The poor results of Comparative Samples B and C are believed to be due at least in part to the high level of difunctional acrylate used in those samples.

Examples 1-7 produce foams having densities of about 35 kg/m$^3$ or less. This is significantly lower than the densities produced in the examples of U.S. Pat. No. 7,919,540. Compressive strengths are surprisingly high, especially when normalized to foam density. The specific compressive strengths of Examples 1-7 is at least 4 kN·m/kg in each case and is as high as 5.50 kN·m/kg in some cases. By contrast, the foams described in U.S. Pat. No. 7,919,540 examples have specific strengths of about 3.2 or lower.

EXAMPLES 8-10

Foam Examples 8-10 are made and tested using the same procedures described above for Examples 1-7. The formulations are described in Table 3 below and results are as indicated in Table 4.

TABLE 3

| Ingredient | Ex 8 | Ex 9 | Ex 10 |
|---|---|---|---|
| A-side | | | |
| Tetrafunctional acrylate | 15.76 | 21.71 | 35.67 |
| Difunctional acrylate A | 20.48 | 28.22 | 46.37 |

TABLE 3-continued

| Ingredient | Ex 8 | Ex 9 | Ex 10 |
|---|---|---|---|
| Hexafunctional acrylate | 11.03 | 15.20 | 24.97 |
| Surfactant | 0 | 2.98 | 5.61 |
| HFC 245fa | 3.38 | 4.66 | 0 |
| HFC 134a | 11.11 | 15.31 | 0 |
| HCFO-1233zd | 0 | 0 | 11.48 |
| HFO1234ze | 0 | 0 | 27.34 |
| TEP | 1.04 | 1.43 | 2.35 |
| Total | 62.80 | 89.50 | 153.8 |
| Weight ratio, difunctional acrylate/tetrafunctional acrylate/hexafunctional acrylate | 43.34:33.33:23.34 | 43.34:33.33:23.34 | 43.34:33.33:23.34 |
| A-side pressure, kPag | Not measured | Not measured | 640 |
| B-side | | | |
| TMP trisAcac | 21.72 | 18.00 | 51.11 |
| TMG | 5.28 | 4.38 | 12.44 |
| Fyrolflex BDP | 9.73 | 8.06 | 22.90 |
| Brominated FR | 7.30 | 6.05 | 17.19 |
| Surfactant | 2.63 | 0 | 2.55 |
| HFC 245fa | 0 | 0 | 0 |
| HFC 134a | 8.91 | 7.39 | 0 |
| HFO | 0 | 0 | 9.8 |
| HFO1234ze | 0 | 0 | 22.8 |
| Total | 55.58 | 43.87 | 138.56 |
| B-side pressure, kPag | Not measured | Not measured | 803 |
| Equivalent ratio, acrylates:TMP acac | 1.63 | 2.71 | 1.57 |
| Equivalent ratio, TMG:TMP acac | 0.272 | 0.272 | 0.272 |

TABLE 4

| Property | Example 8 | Example 9 | Example 10 |
|---|---|---|---|
| Gel time, s | 60 | 92 | 100 |
| Tack-free time, s | 150 | 120 | 160 |
| Density, kg/m$^3$ | 47.9 | 46.6 | 43.2 |
| Open cell content, % | 43 | 47 | 73 |

Example 8 demonstrates that a foams can be successfully produced with a surfactant only on the B side. Example 11 demonstrates that foam can be successfully produced with surfactant only on the A side, provided the catalyst level is high enough. Example 12 demonstrates that certain olefin blowing agents HFOs can be substituted for HFCs.

EXAMPLES 11-12

Foam Examples 11-12 are made and tested using the same procedures described above for Examples 1-7. The formulations are described in Table 5 below and the results in Table 6.

TABLE 5

| Ingredient | Example 11 | Example 12 |
|---|---|---|
| A-side | | |
| Tetrafunctional acrylate | 2.58 | 36.30 |
| Hexafunctional acrylate | 1.80 | 25.41 |
| Difunctional acrylate A | 3.35 | 47.19 |
| Surfactant | 0.40 | 5.57 |
| HFC 245fa | 0.79 | 11.13 |
| HFC 134a | 1.82 | 25.60 |
| TEP | 0.17 | 2.40 |
| Total | 10.90 | 153.60 |
| Weight ratio, difunctional acrylate/tetrafunctional acrylate/hexafunctional acrylate | 43.34:33.33:23.34 | 43.34:33.33:23.34 |
| A-side pressure, kPag | 605 | 605 |
| B-side | | |
| Gly trisAcAc | 2.68 | 35.69 |
| TMG | 0.73 | 9.75 |
| Fyrolflex BDP | 1.35 | 17.94 |
| Brominated FR | 1.01 | 13.47 |
| Surfactant | 0.14 | 1.88 |
| HFC 245fa | 0.53 | 7.04 |
| HFC 134a | 1.46 | 19.44 |
| Total | 7.90 | 105.21 |
| B-side pressure, kPag | 802 | 802 |
| Equivalent ratio, acrylates:TMP acac | 1.93 | 2.04 |
| Equivalent ratio, TMG:TMP acac | 0.272 | 0.272 |

TABLE 6

| | | Result | |
|---|---|---|---|
| Property | | Example 11 | Example 12 |
| Gel time, s | | 120 | 165 |
| Tack-free time, s | | 180 | 220 |
| Density, kg/m$^3$ | | 41.2 | NA |
| Open cell content, % | | 70 | NA |

Examples 15 and 16 show that glycerol tris AcAc can be substituted as a carbon-Michael donor in the foam formulation for tris AcAc without loss of ability to make foam.

EXAMPLES 13-15 AND FLAME RETARDANT SCREENING EXPERIMENTS

A series of flame retardant screening experiments are performed. In these screening experiments, the tetrafunctional acrylate and difunctional acrylate as described in the previous examples are mixed with tetramethyl guanidine catalyst, HFC 245 fa and flame retardant as indicated in Table 2 below on a high-speed laboratory mixer at room temperature. TMP trisAcac or mixture thereof with flame retardant as indicated in Table 2 is then blended into the acrylate mixture for 30 seconds, and the reaction mixture is then poured into a mold and allowed to rise and cure with applied heat. In these screening experiments, the equivalent ratio of acrylate to acetylacetonate groups is 1:1; the equivalent ratio of catalyst to acetylacetonate groups is 0.075:1, 20 parts by weight blowing agent is used per 100 parts by weight monomers and 1.5 parts by weight blowing agent is used per 100 parts by weight monomers. For each foam so produced, glass transition temperature, foam density, open cell content and burn rate according to ASTM D 4986 are measured. Results are as indicated in Table 7.

The flame retardants mentioned in Table 7 are as follows:
AP: aluminum phosphite (Exolit OP 935, Clariant).
PHT-4 diol: a tetrabromophthalate diol from Chemtura Corporation.
TEP: triethyl phosphate.
FR-63: A brominated styrene-butadiene triblock copolymer containing 63% by weight bromine.
BPS: A brominated polystyrene marketed as Sayten HP 7010P by Albemarle Corporation.
FR2001: A brominated epoxy resin from ICL Industries.
FR1025: A brominated polyacrylate resin from ICL Industries.
FR 370: Tris(3-bromo-2,2-(bromomethyl)propyl)phosphate).
Fyrol PNX: An alkylphosphate oligomer containing 19% by weight phosphorus from ICL Industries.

TABLE 7

| Sample | Flame Retardants | Flame Retardant amounts | ASTM D 4986 Burn Rate (cm/min) | Foam Density (kg/m$^3$) | Open Cell Content, % | $T_g$, °C. |
|---|---|---|---|---|---|---|
| SE-1 | AP | To provide 1.5% phosphorus | 0.51 | 30.4 | 18 | 95 |
| SE-2 | (i) AP; (ii) PHT-4 diol; (iii) TEP | (i) To provide 1.5% phosphorus; (ii) To provide 5% Br; (iii) 3% by weight on B-side | 0 | 36.8 | 20 | 84 |
| SE-3 | (i) AP; (ii) PHT-4 diol; (iii) TEP | (i) To provide 1.875% phosphorus; (ii) To provide 3% Br; (iii) 3% by weight on B-side | 0.25 | 30.2 | 24 | 82 |
| SE-4 | (i) AP; (ii) PHT-4 diol; (iii) TEP | (i) To provide 1% phosphorus; (ii) To provide 3% Br; (iii) 3% by weight on B-side | 7.9 | 30.2 | 25 | 76 |
| SE-5 | (i) AP; (ii) TEP | (i) To provide 0.25% phosphorus; (ii) 3% by weight on B-side | 11.7 | 28.6 | 76 | 79 |
| SE-6 | (i) AP; (ii) PHT-4 diol; (iii) TEP | (i) To provide 0.25% phosphorus; (ii) To provide 5% Br; (iii) 3% by weight on B-side | 3.0 | 33.1 | 17 | 83 |
| SE-7 | (i) AP; (ii) PHT-4 diol; (iii) TEP | (i) To provide 0.875% phosphorus; (ii) To provide 2.5% Br; (iii) 3% by weight on B-side | 3.6 | 30.6 | 39 | 85 |
| SE-8 | (i) FR-63; (ii) TEP | (i) To provide 3% Br; (ii) 3% by weight on B-side | 0.76 | 28.8 | 28 | 86 |
| SE-9 | (i) BPS; (ii) TEP | (i) To provide 3% Br; (ii) 3% by weight on B-side | 9.7 | 33.6 | 27 | 75 |
| SE-10 | (i) AP; (ii) FR2001; (iii) TEP | (i) To provide 0.875% phosphorus; (ii) To provide 2% Br; (iii) 3% by weight on B-side | 1.3 | 30.2 | 26 | 87 |
| SE-11 | (i) AP; (ii) FR1025; (iii) TEP | (i) To provide 0.875% phosphorus; (ii) To provide 3% Br; (iii) 3% by weight on B-side | 4.1 | 29.8 | 89 | 85 |
| SE-12 | (i) AP; (ii) FR 370; (iii) TEP | (i) To provide 0.875% phosphorus; (ii) To provide 2% Br; (iii) 3% by weight on B-side | 3.0 | 31.7 | 90 | 87 |
| SE-13 | (i) FR-63; (ii) Fyrol PNX; (iii) TEP | (i) To provide 3% Br; (ii) To provide 1% phosphorus; (iii) 3% by weight on B-side | 0.3 | 34.4 | 24 | 91 |

The results indicated in Table 7 show a relationship between glass transition temperature of foams that contain flame retardants, and their performance on the burn test. Foams having glass transition temperatures of 80° C. and above perform well on the burn test, but those having lower glass transition temperatures perform less well.

Foam Examples 13-15 are made from the formulations set out in Table 8, according to the following procedure:

The A-side mixture is prepared by heating difunctional acrylate to about 52° C. and adding the other acrylates, surfactant and flame retardants. The blowing agent is then added, and the clear homogenous mixture is obtained. This mixture is stored in a day tank.

The B-side mixture is prepared by adding the TMG catalyst to an agitated blend of TMP trisAcac and flame retardants. A slightly cloudy liquid is obtained which becomes clear when the blowing agent is added. This mixture is stored in a second day tank.

The A-side and B-side components are processed through an Isotherm PSM 700 High-Pressure Spray Machine and sprayed at 43° C. onto cardboard. The foam starts to rise after 35 seconds, gelled after around 80 seconds and is tack-free after about 130 seconds. The foam density in each case is about 35 to 42 kg/m³.

Foam Examples 13, 14 and 15 are evaluated on a cone calorimeter test according to ASTM E1354-11B, the ASTM E84 flame spread test and for smoke development index according to ASTM E84-12. In addition, foam density and ASTM 4986 burn rate are measured for Example 15. Results are as indicated in Table 4.

TABLE 8

| Ingredient | Example 13 | Example 14 | Example 15 |
|---|---|---|---|
| | Parts by weight | | |
| A-side | | | |
| Tetrafunctional acrylate | 25.59 | 39.43 | 14.17 |
| Hexafunctional acrylate | 17.91 | 0 | 9.92 |
| CN2601 | 0 | 12.45 | 0 |
| Difunctional acrylate A | 33.27 | 14.40 | 18.42 |
| Surfactant | 2.64 | 2.35 | 2.23 |
| HFC 245fa | 17.39 | 18.05 | 4.34 |
| HFC 134a | 0 | 0 | 9.99 |
| Aluminum Phosphite | 0 | 13.32 | 0 |
| Triethyl phosphate | 3.19 | 0 | 0.94 |
| B-side | | | |
| TMP trisAcac | 48.06 | 51.60 | 14.95 |
| PHT-4 diol | 15.20 | 6.04 | 5.03 |
| Fyrolflex BDP | 17.61 | 18.93 | 6.70 |
| Triethyl phosphate | 0 | 5.73 | 0 |
| TMG | 5.46 | 5.54 | 3.64 |
| HFC 245fa | 13.67 | 12.17 | 2.80 |
| HFC 134a | 0 | 0 | 6.14 |
| Test Results | | | |
| Cone Calorimeter test, PHRR (kW/m²) | 231 | 204 | 221 |
| Flame spread index | <25 | <25 | 10 |
| Smoke development index | <450 (12.7 mm panels); >450 (25.4 mm panels) | <450 (12.7 mm panels); >450 (25.4 mm panels) | 195 |
| Foam Density, kg/m³ | ND | ND | 38.4 |
| Open cell content, % | ND | ND | 73 |
| Burn rate, cm/min | ND | ND | 4.1 |

The invention claimed is:

1. A process for making a polymer foam, comprising the steps of:
forming an at least partially expanded reaction mixture by combining, at a temperature of at least 10° C., (1) a multifunctional Michael acceptor that has multiple Michael acceptor functionalities per molecule with (2) a multifunctional carbon-Michael donor in the presence of (3) a surfactant, (4) a carbon-Michael reaction catalyst and (5) a blowing agent composition containing a blowing agent that has a boiling temperature in the range −40° C. to +100° C.,
dispensing the partially expanded reaction mixture and curing the dispensed reaction mixture to form a polymer foam,
wherein the at least partially expanded reaction mixture is formed by:
(a) forming a pressurized A-side component comprising the multifunctional Michael acceptor and, dissolved in the A-side component, a blowing agent composition containing a blowing agent that has a boiling temperature in the range −40° C. to +100° C.; wherein the A-side component has a Brookfield viscosity of 5,000 centipoises or less at 25° C.;
(b) separately forming a pressurized B-side component comprising the multifunctional carbon-Michael donor, the surfactant and, dissolved in the B-side component, a blowing agent composition containing a blowing agent that has a boiling temperature in the range −40° C. to +100° C.; wherein the B-side component has a Brookfield viscosity at 25° C. from 0.2 to 5 times that of the A-side component but not greater than 2,500 centipoises;
(c) separately depressurizing the pressurized A-side component and the pressurized B-side component such that the A-side component and the B-side component each at least partially expand due to expansion of the blowing agent composition;
(d) combining the at least partially expanded A-side component and the at least partially expanded B-side component in the presence of the carbon-Michael reaction catalyst to form the reaction mixture.

2. The process of claim 1, wherein the partially expanded reaction mixture is dispensed onto a substrate and cured on the substrate to form a boardstock.

3. The process of claim 1 wherein step (c) is performed by separately dispensing the A-side component into separate conduits, step (d) is performed by combining the at least partially expanded A-side component and the at least partially expanded B-side component in a mixing chamber, and the resulting reaction mixture is expelled from the mixing chamber through a nozzle prior to curing the dispensed reaction mixture to form a polymer foam.

4. The process of claim 1, wherein the multifunctional Michael acceptor is a polyacrylate and the multifunctional carbon-Michael donor is at least one compound that contains one or more β-diketo or β-cyanoketo groups.

5. The process of claim 4 wherein the multifunctional carbon-Michael donor contains two or more acetoacetate, cyanoacetate, acetoacetamide or malonate groups.

6. The process of claim 5, further characterized by the multifunctional Michael acceptor being a mixture of at least one difunctional acrylate compound and at least one tetrafunctional acrylate compound.

7. The process of claim 6, wherein the mixture of at least one difunctional acrylate compound and at least one tetrafunctional acrylate compound contains 15 to 40%, by weight of one or more difunctional Michael acceptor compounds, and the remainder trifunctional or higher functionality Michael acceptor compounds.

8. The process of claim 7, further characterized by the multifunctional Michael donor containing two or more acetoacetate groups.

9. The process of claim 1, wherein 0.1 to 0.5 moles of carbon-Michael reaction catalyst are present per equivalent of carbon-Michael donor functionalities.

10. The process of claim 1, wherein the blowing agent composition contains a blowing agent that has a boiling temperature in the range −40° C. to +10° C.

11. The process of claim 1, wherein the blowing agent composition contains a blowing agent that has a boiling temperature in the range −40° C. to +10° C. and a blowing agent that has a boiling temperature in the range 15° C. to +70° C.

12. A polymeric spray foam system comprising:
(a) an A-side component comprising a multifunctional Michael acceptor that has multiple Michael acceptor functionalities per molecule and, dissolved in the A-side component, a blowing agent composition containing a blowing agent that has a boiling temperature in the range −40° C. to +100° C.; wherein the A-side component has a Brookfield viscosity of 2,500 centipoises or less at 25° C.;
(b) a separate B-side component comprising a multifunctional carbon-Michael donor, a surfactant and, dissolved in the B-side component, a blowing agent composition containing a blowing agent that has a boiling temperature in the range −40° C. to +100° C.; wherein the B-side component has a Brookfield viscosity at 25° C. from 0.2 to 5 times that of the A-side component but not greater than 2,500 centipoises; and
(c) a carbon-Michael reaction catalyst.

13. The polymeric spray foam system of claim 12, wherein the blowing agent composition contains a blowing agent that has a boiling temperature in the range −40° C. to +10° C.

14. The polymeric spray foam system of claim 12, wherein the blowing agent composition contains a blowing agent that has a boiling temperature in the range −40° C. to +10° C. and a blowing agent that has a boiling temperature in the range 15° C. to +70° C.

* * * * *